US008508476B2

(12) United States Patent
Wang et al.

(10) Patent No.: US 8,508,476 B2
(45) Date of Patent: Aug. 13, 2013

(54) TOUCH-SENSITIVE CONTROL SYSTEMS AND METHODS

(75) Inventors: Yi-Shen Wang, Taoyuan County (TW); Cheng-Chieh Chuang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 434 days.

(21) Appl. No.: 12/501,052

(22) Filed: Jul. 10, 2009

(65) Prior Publication Data
US 2010/0007604 A1    Jan. 14, 2010

(30) Foreign Application Priority Data

Jul. 11, 2008    (TW) ................................ 97126260 A

(51) Int. Cl.
*G06F 3/033*    (2006.01)
*G06F 3/041*    (2006.01)
*G06F 3/02*    (2006.01)

(52) U.S. Cl.
USPC ............................ 345/158; 345/169; 345/173

(58) Field of Classification Search
USPC ................................................. 345/156–179
See application file for complete search history.

(56) References Cited

U.S. PATENT DOCUMENTS

| | | | | |
|---|---|---|---|---|
| 6,687,614 B2 * | 2/2004 | Ihara et al. | ..................... | 701/428 |
| 6,757,002 B1 * | 6/2004 | Oross et al. | ................... | 715/864 |
| 7,075,512 B1 * | 7/2006 | Fabre et al. | ................... | 345/156 |
| 7,564,449 B2 * | 7/2009 | Layton et al. | ................. | 345/173 |
| 2006/0125798 A1 * | 6/2006 | Marten | ......................... | 345/173 |
| 2007/0146342 A1 * | 6/2007 | Medler et al. | ................. | 345/173 |
| 2007/0229472 A1 * | 10/2007 | Bytheway | ..................... | 345/173 |

FOREIGN PATENT DOCUMENTS

| | | |
|---|---|---|
| EP | 0 980 039 A2 | 2/2000 |
| EP | 1 098 241 A2 | 5/2001 |
| WO | WO 2007/126801 A2 | 11/2007 |
| WO | WO 2007/149357 A2 | 12/2007 |
| WO | WO 2008/052100 A2 | 5/2008 |

OTHER PUBLICATIONS

"Handbook for the Palm Zire 71 Handheld".*
"Handbook for the Palm Zire 71 Handheld", Internet Citation, URL:http://www.palm.com/us/support/handbooks/zire71/zire71/_hb_ENG.pdf> XP007901882, Retrieved on Mar. 20, 2007.
Pogue, David: "iPhone: The Missing Manual"; In "iPhone: The Missing Manual"; (Aug. 31, 2007), O'Reilly Media, Inc., Sebastopol, CA 95472, USA, XP055050480, pp. 20-26.

\* cited by examiner

*Primary Examiner* — Amare Mengistu
*Assistant Examiner* — Jennifer Zubajlo
(74) *Attorney, Agent, or Firm* — Birch, Stewart, Kolasch & Birch, LLP

(57) ABSTRACT

Touch-sensitive control systems and methods are provided. The touch-sensitive control system includes a touch interface and a sensor. The touch interface includes a first zone and a second zone having an icon corresponding to a function. The sensor is disposed under the touch interface for detecting contacts on the physical interface. When a contact on the icon of the second zone is detected by the sensor, the corresponding function is activated. When a movement on the first zone is detected by the sensor, an operation corresponding to the function is performed according to the movement.

7 Claims, 9 Drawing Sheets

TOUCH-SENSITIVE CONTROL SYSTEMS AND METHODS

CROSS REFERENCE TO RELATED APPLICATIONS

This Application claims priority of Taiwan Patent Application No. 097126260, filed on Jul. 11, 2008, the entirety of which is incorporated by reference herein.

BACKGROUND OF THE INVENTION

1. Field of the Invention

The disclosure relates generally to touch-sensitive control systems and methods, and, more particularly to systems and methods that rapidly activate and execute functions via a touch-sensitive interface having a sensor.

2. Description of the Related Art

Recently, portable devices, such as handheld devices, have become more and more technically advanced and multifunctional. For example, a handheld device may have e-mail message capabilities, an advanced address book management system, a media playback system, and various other functions. Due to increased convenience and functions of the devices, these devices have become necessities of life.

Handheld devices are usually equipped with at least one input device, such as a touch-sensitive interface and/or a touch-sensitive monitor for controlling the functions in the devices. Generally, when users want to switch functions, users must repeatedly unfold, move, and select specific function items from a menu via the touch-sensitive interface and/or the touch-sensitive monitor, thus completely switching between functions. Since handheld devices cannot be controlled using a mouse or a touch pad, like notebook computers, and only a small area on the handheld device can be used to set the input device, the described operations are complex, inconvenient, and time-consuming for users; especially, for handheld devices without touch-sensitive functions.

BRIEF SUMMARY OF THE INVENTION

Touch-sensitive control systems and methods are provided.

An embodiment of a touch-sensitive control system includes a touch interface and a sensor. The touch interface includes at least a first zone and a second zone. The second zone has at least one icon corresponding to a function. The sensor is disposed under the touch interface for detecting contacts on the physical touch interface. When a contact on the icon of the second zone is detected by the sensor, the corresponding function is activated. When a movement on the first zone is detected by the sensor, an operation corresponding to the function is performed according to the movement.

In one embodiment, a touch-sensitive control method for an electronic device, which has a touch interface and a sensor disposed under the touch interface, is disclosed, wherein the touch interface includes at least a first zone and a second zone having at least one icon corresponding to a function, and contact or movement on the touch interface are detected by the sensor. When a contact on the icon of the second zone is detected by the sensor, the corresponding function is activated. When a movement on the first zone is detected by the sensor, an operation corresponding to the function is performed according to the movement.

Touch-sensitive control systems and methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Touch-sensitive control systems and methods are provided.

Figure 1:
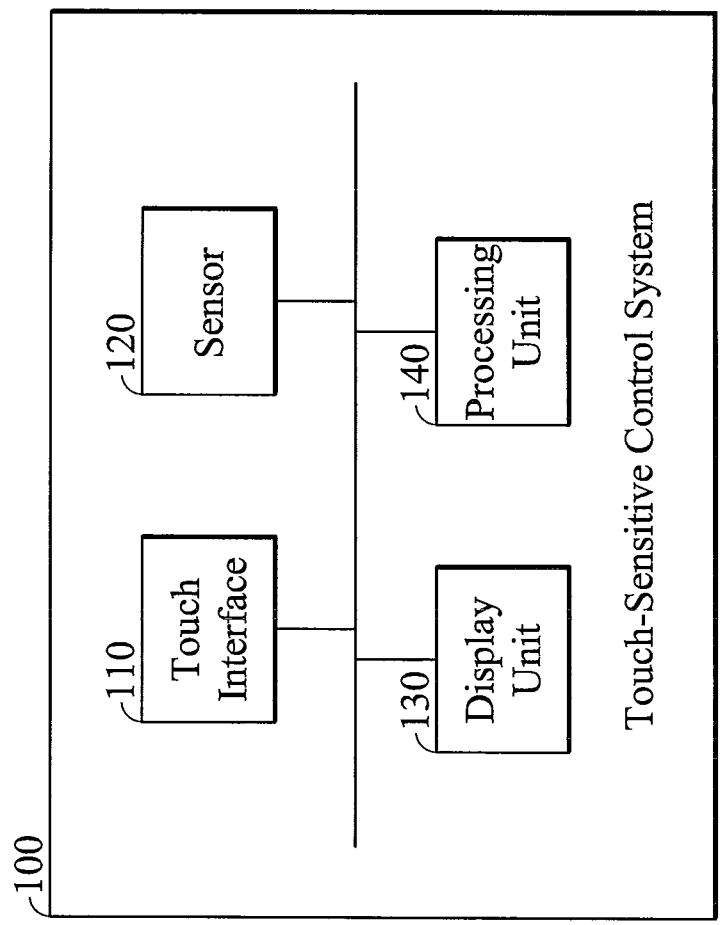
FIG. 1 is a schematic diagram illustrating an embodiment of a touch-sensitive control system according to the present invention.

FIG. 1 is a schematic diagram illustrating an embodiment of a touch-sensitive control system according to the present invention. The touch-sensitive control system 100 can be an electronic device, and more preferably a portable device, such as a media player, a notebook, a PDA (Personal Digital Assistant), a GPS (Global Positioning System) device, a smart phone, or a mobile phone.

Figure 2:
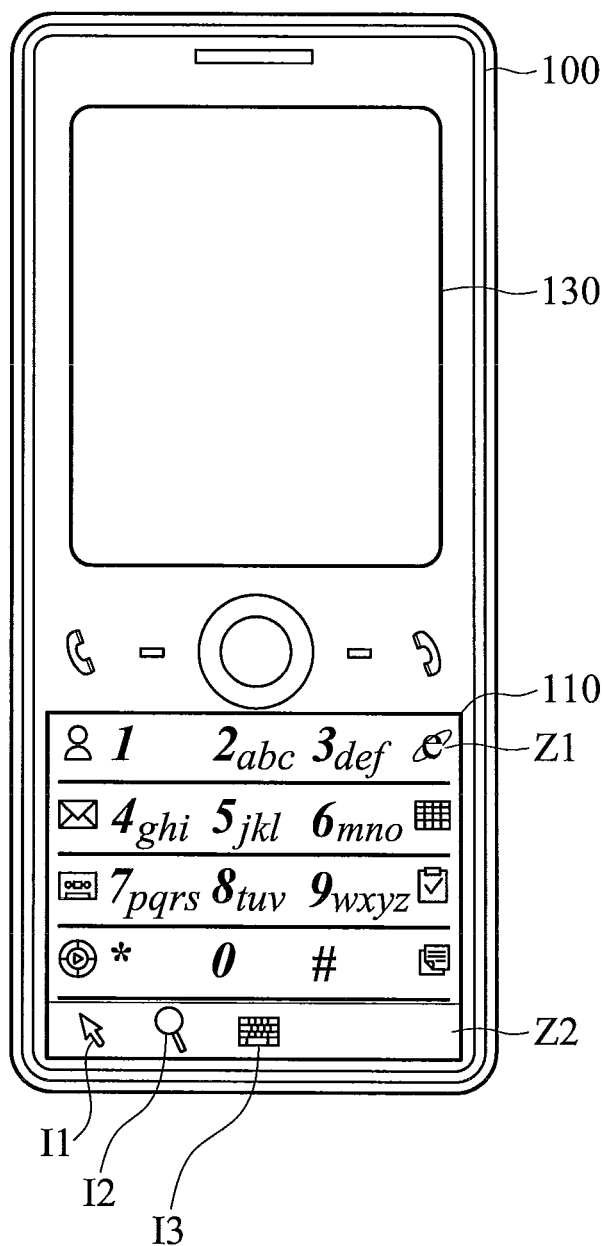
FIG. 2 is a schematic diagram illustrating an embodiment of a touch-sensitive control system according to the present invention.

The touch-sensitive control system 100 comprises a touch interface 110, a sensor 120, a display unit 130, and a processing unit 140. The touch interface 110 is an input interface of the touch-sensitive control system 100. The touch interface 110 comprises at least a first zone Z1 and a second zone Z2, as shown in FIG. 2. The first zone Z1 of the touch interface 110 may be a touch-sensitive keyboard comprising digits, characters, symbols and/or specific function keys. When a key of the touch-sensitive keyboard is pressed, a corresponding digit, character or symbol is then input to the touch-sensitive control system 100. The second zone Z2 of the touch interface 110 may be a tool bar. The tool bar may have at least one icon corresponding to a function. In some embodiments, the tool bar may have icons I1, I2 and I3 corresponding to a cursor function, a magnifying function, and an input method switch function, respectively. The activation and control operations of the functions in the tool bar are discussed later. The sensor 120 is disposed under the touch interface 110 to detect contact and movement of an input tool, such as a stylus or finger near or on the touch interface 110. The sensor 120 may be a capacitive touch-sensitive sensor, a resistive touch-sensitive sensor, an infrared sensor, an ultrasonic sensor, or a pressure sensor. When one of the functions at the tool bar is activated, the display unit 130 can display a corresponding function object for operation, such as a cursor, a specific region, wherein data within the specific region is magnified, and/or a menu. When a movement on the first zone Z1 is detected by the sensor 120, a function object for operation can be moved according to the detected movement. The processing unit 140 performs the touch-sensitive control method of the invention, which will be discussed further in the following paragraphs.

Figure 3:
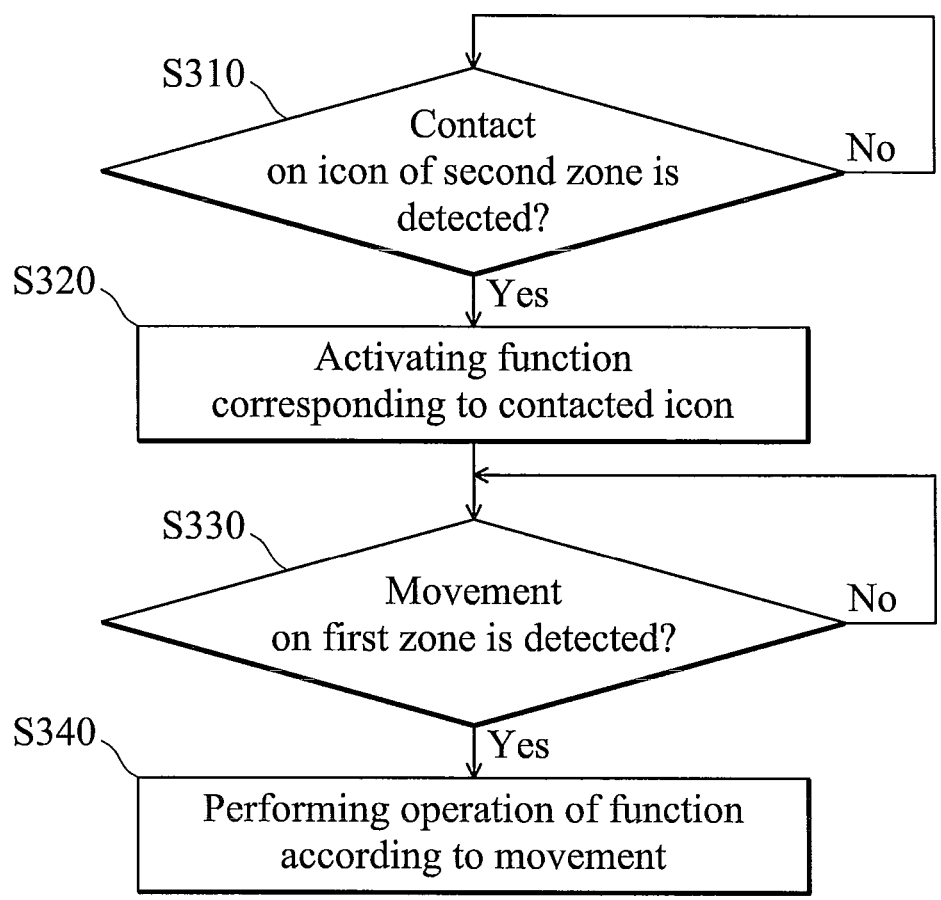
FIG. 3 is a flowchart of an embodiment of a touch-sensitive control method according to the present invention.

FIG. 3 is a flowchart of an embodiment of a touch-sensitive control method according to the present invention.

In step S310, it is determined whether a contact on an icon of the second zone of the touch interface is detected. If no contact on any icon of the second zone of the touch interface is detected (No in step S310), the determination of step S310 continues. If a contact on an icon of the second zone of the touch interface is detected (Yes in step S310), a function corresponding to the contacted icon is activated in response to the contact in step S320. Then, in step S330, it is determined whether a movement on the first zone of the touch interface is detected. If no movement on the first zone of the touch interface is detected (No in step S330), the determination of step S330 continues. If a movement on the first zone of the touch interface is detected (Yes in step S330), an operation corresponding to the activated function is performed according to the detected movement in step S340.

It is understood that, when the function corresponding to the contacted icon is activated, at least one function object for operation corresponding to the activated function can be further displayed on the display unit. When a movement on the first zone is detected, the function object for operation can be moved according to the detected movement. It is noted that, the movement corresponding to the function object for operation can be also displayed on the display unit.

As described, in some embodiments, the tool bar may have icons I1, I2 and I3 corresponding to a cursor function, a magnifying function, and an input method switch function, respectively. The control methods for the cursor function, the magnifying function, and the input method switch function are respectively disclosed as follows.

Cursor Function

Figure 4A:
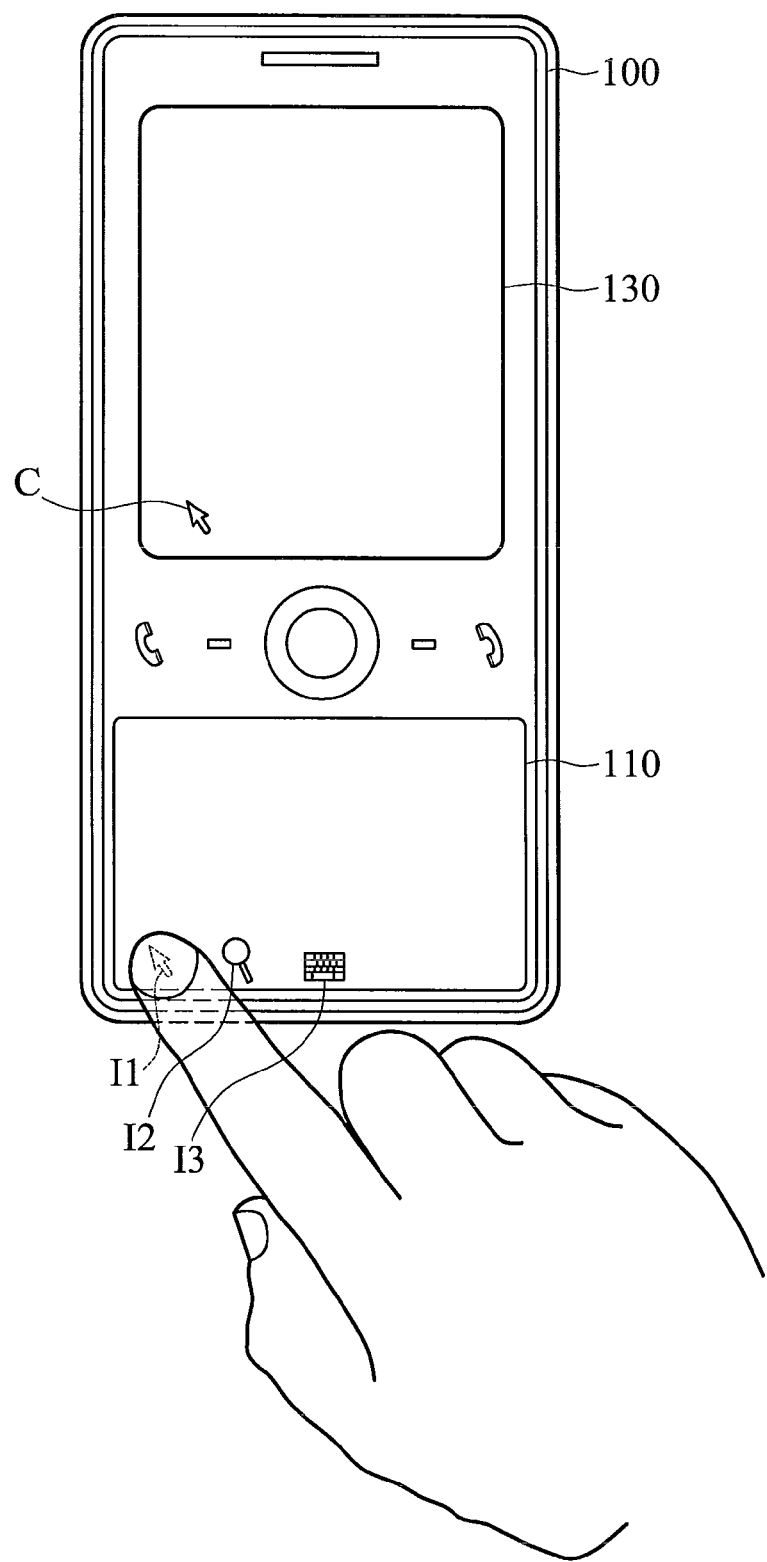
FIGS. 4A and 4B are schematic diagrams illustrating an embodiment of an example of cursor control according to the present invention.
Figure 4B:
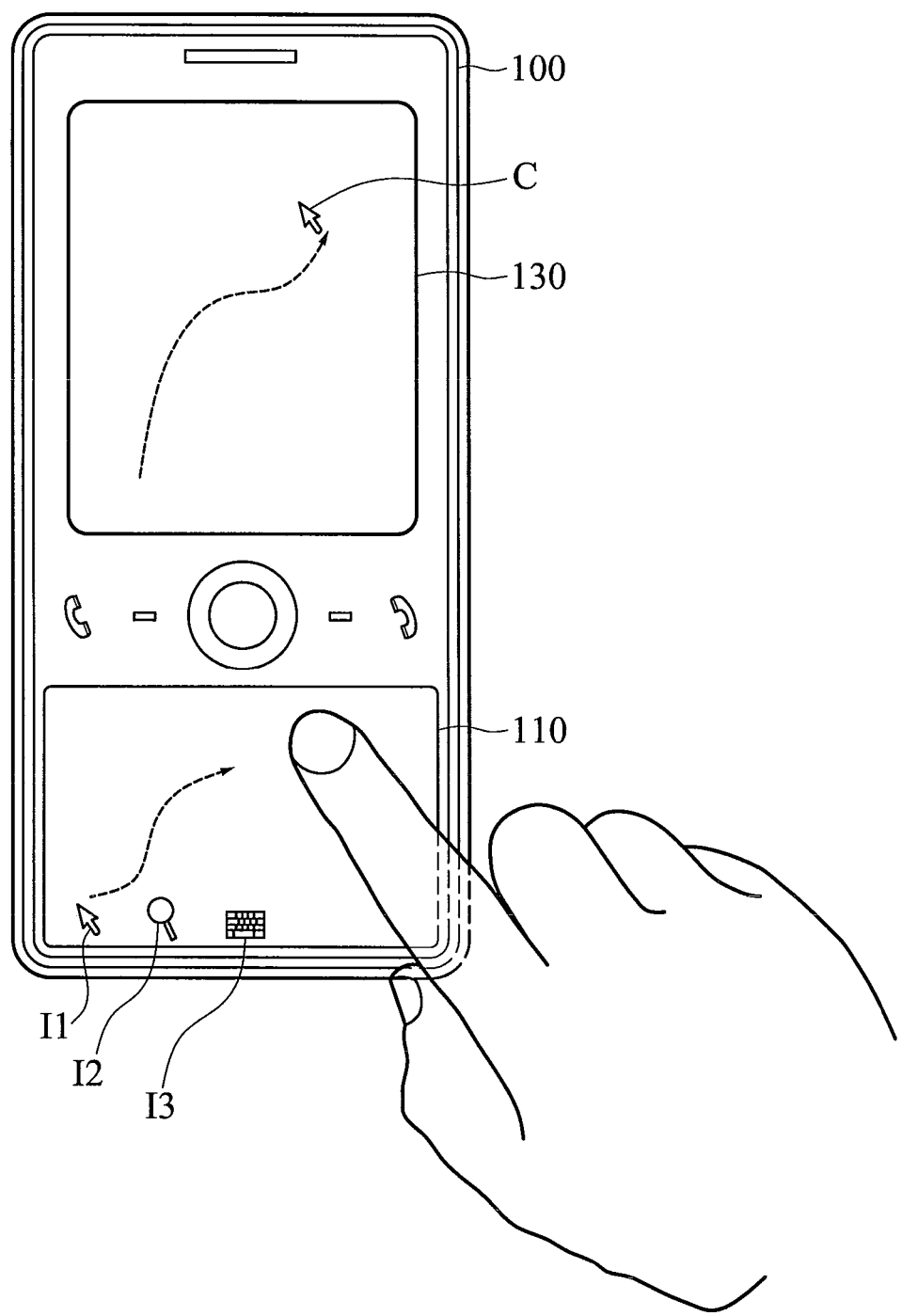

When a contact of a user's finger on the icon I1 of the second zone Z2 of the touch interface 110 is detected by the sensor 120, the corresponding cursor function is activated, and a cursor C is displayed at a position of the display unit 130, corresponding to the contact position at the touch interface 110, as shown in FIG. 4A. It is understood that, in some embodiments, after the icon I1 is contacted, the user's finger must continue to contact the touch interface 110, and be dragged from the second zone Z2 to the first zone Z1, such that the cursor function is activated. When a movement corresponding to the user's finger on the first zone Z1 is detected by the sensor 120, the cursor C in the display unit 130 is moved according to the movement of the user's finger on the first zone Z1, as shown in FIG. 4B. When the cursor C is moved to a specific position, the user can use the finger to touch the first zone Z1 again, such that an object corresponding to the specific position is selected.

Magnifying Function

Figure 5A:
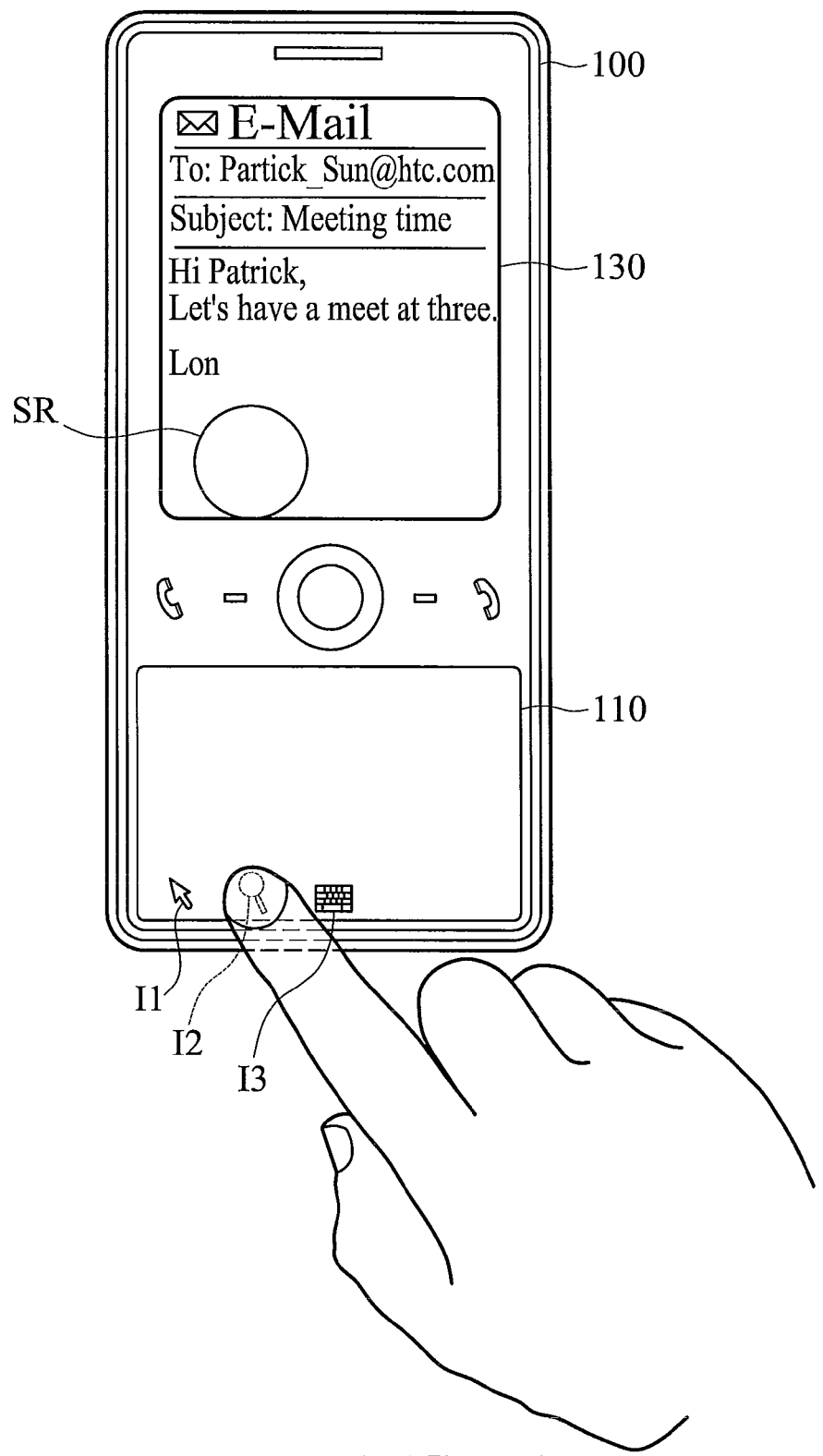
FIGS. 5A and 5B are schematic diagrams illustrating an embodiment of an example of magnifying glass control according to the present invention.
Figure 5B:
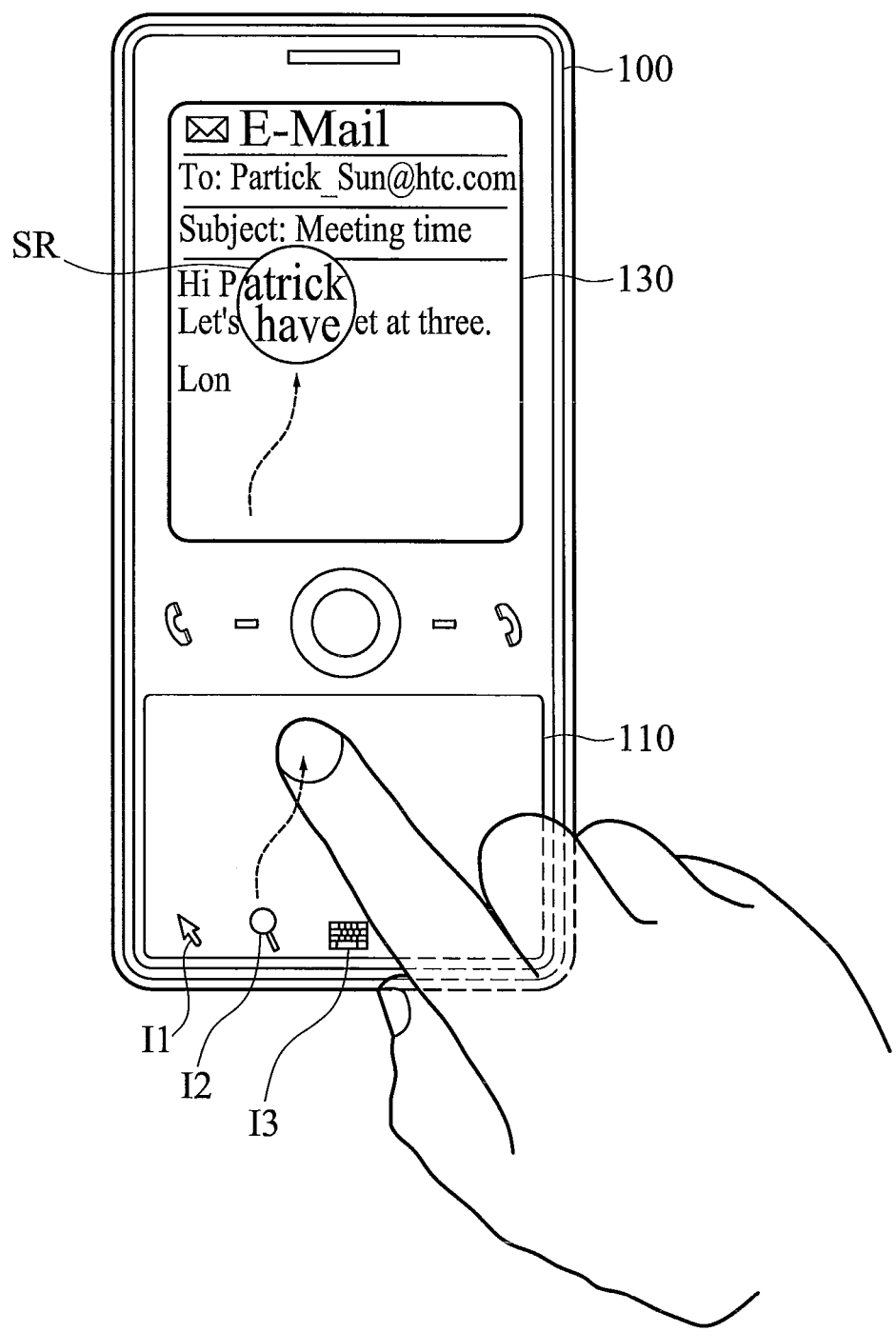

When a contact of a user's finger on the icon I2 of the second zone Z2 of the touch interface 110 is detected by the sensor 120, the corresponding magnifying function is activated, and a specific region SR is displayed on the display unit 130, as shown in FIG. 5A, wherein the data within the specific region SR is magnified. In some embodiments, the specific region SR can be displayed at a position of the display unit 130, corresponding to the contact position at the touch interface 110; Similarly, in some embodiments, after the icon I2 is contacted, the user's finger must continue to contact the touch interface 110, and be dragged from the second zone Z2 to the first zone Z1, such that the magnifying glass function is activated. When a movement corresponding to the user's finger on the first zone Z1 is detected by the sensor 120, the specific region SR on the display unit 130 is moved according to the movement of the user's finger on the first zone Z1, and the data within the specific region SR is magnified, as shown in FIG. 5B.

Input Method Switch Function

Figure 6A:
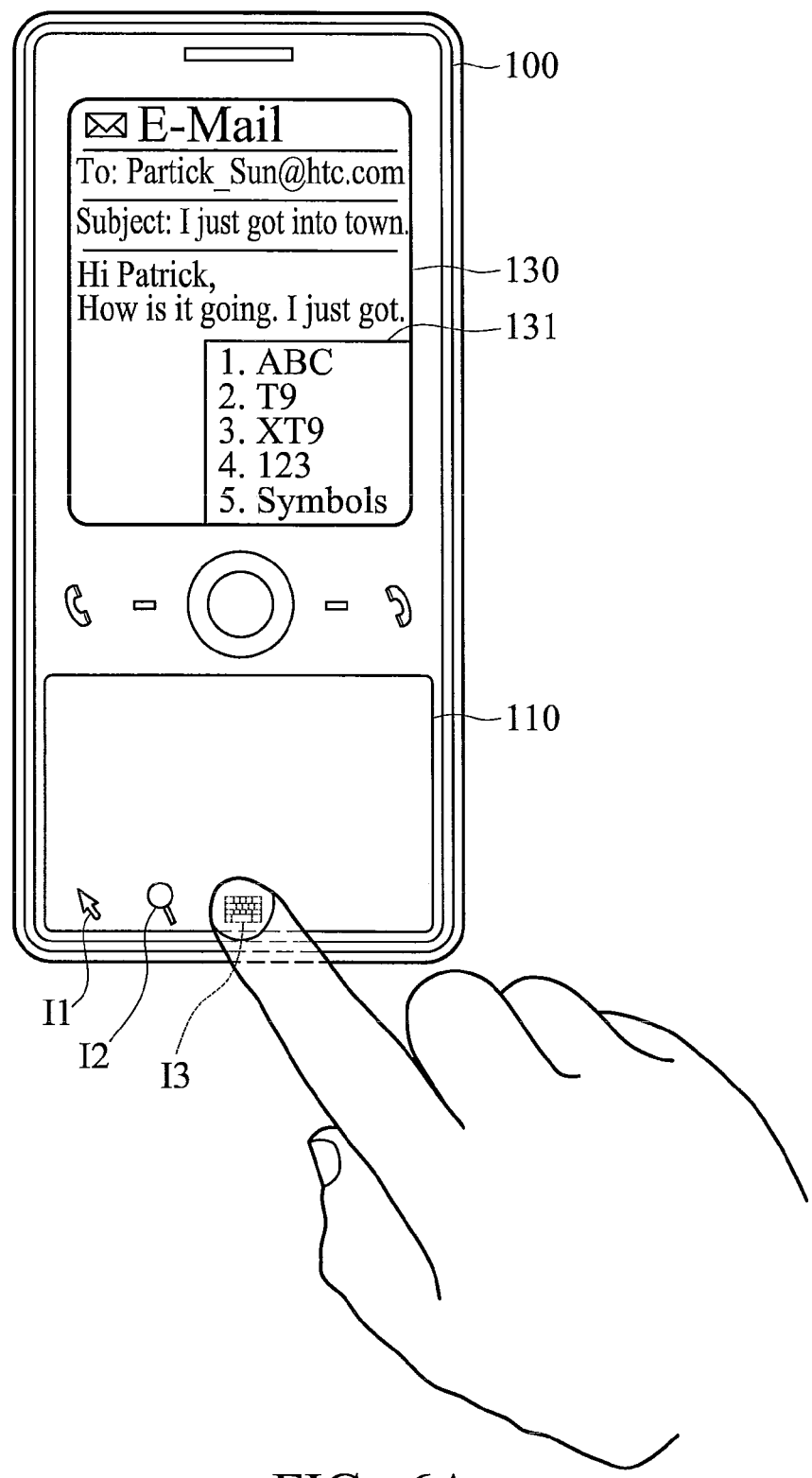
FIGS. 6A and 6B are schematic diagrams illustrating an embodiment of an example of input method switch control according to the present invention.
Figure 6B:
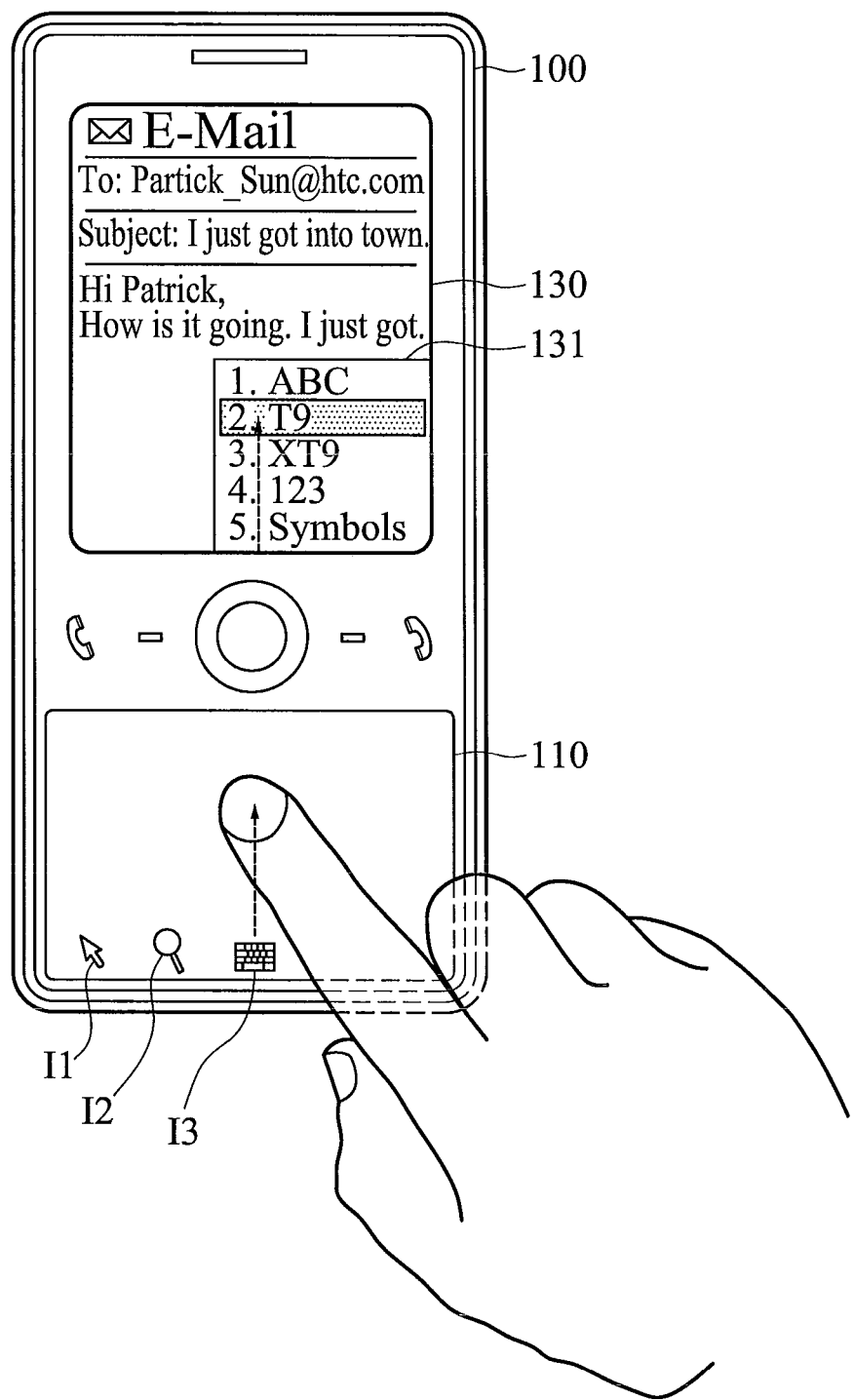

When a contact of a user's finger on the icon I3 of the second zone Z2 of the touch interface 110 is detected by the sensor 120, the corresponding input method switch function is activated, and an input method selection interface 131 is displayed on the display unit 130, as shown in FIG. 6A. In this embodiment, the input method selection interface 131 has a plurality of selections of input methods, such as ABC, T9, XT9, 123 and Symbols. Similarly, in some embodiments, after the icon I3 is contacted, the user's finger must continue to contact the touch interface 110, and be dragged from the second zone Z2 to the first zone Z1, such that the input method switch function is activated. When a movement corresponding to the user's finger on the first zone Z1 is detected by the sensor 120, a selection among the input method selections of the input method selection interface 131 is moved according to the movement of the user's finger on the first zone Z1, as shown in FIG. 6B. When the selection is moved to a specific input method, the user can use the finger to touch the first zone Z1 again, such that the specific input method is selected.

It is understood that, the cursor function, the magnifying function, and the input method switch function are examples of the present application. However, the present invention is not limited thereto, and any function can be applied in the present invention. Therefore, the touch-sensitive control systems and methods of the application can rapidly activate functions and execute operations of the functions via a touch-sensitive interface having a sensor.

Touch-sensitive control systems and methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
 a touch interface comprising at least a first zone and a second zone, wherein the first zone is a touch-sensitive keyboard comprising a plurality of input keys, and wherein the second zone comprises at least one icon corresponding to a function;

a display unit for displaying a function object corresponding to the function, wherein the display unit is separated from the touch interface; and a sensor, disposed under the touch interface, for detecting contacts on the touch interface, wherein when a contact on the icon of the second zone is detected by the sensor and dragged from the second zone to the touch-sensitive keyboard, the corresponding function is activated and the corresponding function object is moved on the display unit according to a continuous movement of the contact on the touch-sensitive keyboard.

2. The electronic device of claim 1, which is a media player, a notebook, a PDA (Personal Digital Assistant), a GPS (Global Positioning System) device, or a mobile phone.

3. The electronic device of claim 1, wherein the function object is a cursor.

4. The electronic device of claim 1, wherein the function object is a specific region, and data within the specific region is magnified and displayed on the display unit.

5. The electronic device of claim 1, wherein when one of the input keys is pressed by another touch on the touch-sensitive keyboard, a corresponding character, digit or symbol is input.

6. The electronic device of claim 1, wherein the sensor comprises a capacitive touch-sensitive sensor, a resistive touch-sensitive sensor, an infrared sensor, an ultrasonic sensor, or a pressure sensor.

7. The electronic device of claim 1, wherein the function object is a plurality of selections.

* * * * *